E. A. SCHREIBER.
GASKET FOR HOSE COUPLINGS.
APPLICATION FILED DEC. 10, 1915.
1,197,863.
Patented Sept. 12, 1916.
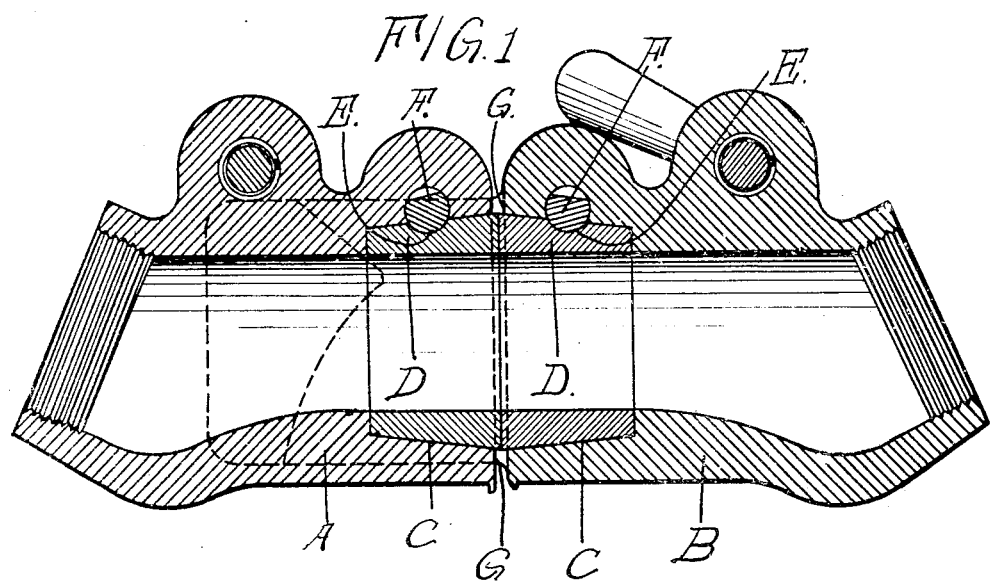
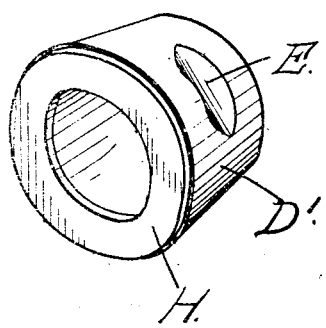
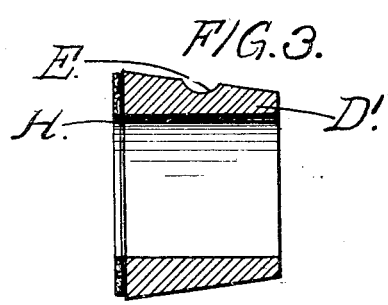
INVENTOR.
Edward A. Schreiber
BY Barnett & Numan
ATTORNEYS.

UNITED STATES PATENT OFFICE.

EDWARD A. SCHREIBER, OF CHICAGO, ILLINOIS, ASSIGNOR TO CHICAGO CAR HEATING COMPANY, OF CHICAGO, ILLINOIS, A CORPORATION OF ILLINOIS.

GASKET FOR HOSE-COUPLINGS.

1,197,863. Specification of Letters Patent. Patented Sept. 12, 1916.

Application filed December 10, 1915. Serial No. 66,150.

*To all whom it may concern:*

Be it known that I, EDWARD A. SCHREIBER, a citizen of the United States, residing at Chicago, in the county of Cook and State of Illinois, have invented certain new and useful Improvements in Gaskets for Hose-Couplings, of which the following is a specification.

My invention relates to and has for its object the provision of an improved form of gasket for hose couplings, more particularly, for the hose couplings used in connection with the steam train pipes of railroad trains.

The gaskets ordinarily used for coupling up the steam train pipes of railroad cars are composed of Jenkins material, or other rubber compositions, having properties similar to Jenkins material. A gasket made of a material of this sort, if long enough, will expand appreciably when steam is brought in contact therewith, and this circumstance is utilized to assist in making a tight joint between the gasket of mating coupler heads. This capacity of the gasket to expand, when subjected to heat, is not very great, unless the gasket is made extremely long, and, therefore, it is the usual practice to arrange the gasket in the hose coupler so that it projects slightly beyond the face of the coupler head. In this way, when mating coupler heads are coupled up the faces of the gaskets will be brought into intimate contact with each other, the gaskets being ordinarily compressed to a certain extent. The expansion of the gaskets under steam serves as an additional factor in insuring a steam-tight joint between the gaskets. This is the way the gaskets will operate when they are new. Experience has shown, however, that after they have been in service for a short time, say for three or four months, they shrink or become compressed and lose their capacity to expand sufficiently under the influence of steam, this effect being due probably to the high temperature to which they are subjected and possibly also to the pressure which each gasket exerts against the other. When this shrinkage, as it will be termed for want of a more generic name, takes place, the coupling necessarily becomes leaky. This can only be remedied by replacing the gaskets with new ones. The material of which the gaskets are made is relatively expensive and the aggregate loss by railroads because of the shrinkage of gaskets otherwise usable is very considerable, besides which, the railroad employees are put to the inconvenience of renewing the gaskets of the train line once or twice during a winter season.

My invention seeks to minimize this loss and inconvenience in the manner to be hereinafter described.

The invention is illustrated, in the accompanying drawing, in which—

Figure 1 is a longitudinal section of a coupling composed of two mating coupler heads of ordinary construction provided each with a gasket also of familiar type. Fig. 2 is a view, in perspective, of the preferred form of gasket made in accordance with my invention, and Fig. 3 is a longitudinal section of the same.

In the drawing, A and B are a pair of mating coupler heads each formed with a recess C for a gasket D. The gaskets are preferably formed with corrugations E engaged by keys F revolubly mounted in the coupler heads. The gaskets, it will be seen, project a trifle beyond the faces G of the coupler heads so that when the latter are in coupled relation the ends of the gaskets are pressed closely one against the other. When steam passes through the coupler the gaskets expand, to the extent that expansion is possible, so that the joint between them is perfectly steam tight. This is the way the gaskets are intended to work. But, as stated above, they shrink after a certain period of service, usually about two months, so that it often happens that the space or crack between the gaskets of a coupler is too large to be taken up by the expansion of the material.

When the gasket has shrunk enough to make the coupling leaky it is taken out and thrown away and a new one put in its place. Frequently the gasket is in good condition except for the fact that it is too short. If injured at all the injury is likely to be on the outer face where it abuts against the gasket in the mating head. My invention contemplates taking these shrunk or shortened gaskets D' (Figs. 2 and 3) and cementing to them an annular facing member H the thickness of which is equal substantially to the longitudinal shrinkage of the original gasket. This facing member is preferably formed of asbestos with some suitable filler, such as graphite. An ordinary rubber cement is used for securing it to the body member D' of the gasket by a vulcanizing operation, for example. Preferably though not necessarily the facing member is secured to the outer end of the gasket so that it provides a relatively tough wearing surface for contact with the gasket of the mating head and covers any worn or frayed places on the original face of the gasket. The re-made gasket when so constructed is better than a gasket composed entirely of rubber composition since its outer face is tougher and will stand more wear. By this arrangement also if the side of the gasket is grooved for a lock key, as shown in the drawing, the addition of the facing member does not alter the relationship between the groove and the key.

It seems to be the fact that after a gasket of Jenkins material, or other rubber composition having similar qualities, has been shortened by pressure and the influence of steam to a certain extent, further treatment under the same conditions produces no further shrinkage. For this reason a gasket which has shortened because of three or four months service and has been provided with a facing member as described above does not shrink when again subjected to the influence of steam and the pressure resulting from the clamping action of the coupler heads and the expansibility of the gaskets. A re-made gasket of this sort will, therefore, last much longer than a gasket made entirely of the rubber composition. It will last until actually worn out.

I claim:

1. A hose coupler gasket of a length to make a steam tight joint with the gasket of a mating coupler head which is made up of a body portion of rubber compound shrunk by the application of heat and by pressure applied longitudinally thereof, and of a facing member secured to one end of said body portion.

2. A hose coupler gasket of a length to make a steam tight joint with the gasket of a mating coupler head which is made up of a body portion of rubber compound shrunk by the application of heat and by pressure applied longitudinally thereof, and of a facing member secured to the outer end of said body portion.

3. A hose coupler gasket of a length to make a steam tight joint with the gasket of a mating coupler head which is made up of a body portion of rubber compound shrunk by the application of heat and by pressure applied longitudinally thereof, and of a facing composed of asbestos and a filler secured to the outer end of the body portion.

4. A hose coupler gasket of a length to make a steam tight joint with the gasket of a mating coupler head which is made up of a body portion of rubber compound shrunk by the application of heat and by pressure applied longitudinally thereof, and of a facing composed of asbestos and graphite secured to the outer end of the body portion.

5. A hose coupler gasket of a length to make a steam tight joint with the gasket of a mating coupler head which is made up of a body portion of rubber compound shrunk by the application of heat and by pressure applied longitudinally thereof, and of a facing member secured to one end of said body portion, the thickness of which is substantially the same as the longitudinal shrinkage of the body portion.

EDWARD A. SCHREIBER.